(12) United States Patent
Gou et al.

(10) Patent No.: US 7,708,895 B2
(45) Date of Patent: May 4, 2010

(54) METHOD AND APPARATUS FOR DEMULSIFYING AN OIL-WATER EMULSION VIA ULTRASONIC

(75) Inventors: Shequan Gou, Zibo (CN); Jianwen Da, Zibo (CN); Yougui Zhang, Zibo (CN); Ping Han, Zibo (CN); Jingyi Zhang, Zibo (CN)

(73) Assignee: China Petroleum & Chemical Corporation, Beijing (CN)

( * ) Notice: Subject to any disclaimer, the term of this patent is extended or adjusted under 35 U.S.C. 154(b) by 579 days.

(21) Appl. No.: 10/569,967

(22) PCT Filed: Aug. 27, 2004

(86) PCT No.: PCT/CN2004/000993

§ 371 (c)(1),
(2), (4) Date: May 17, 2007

(87) PCT Pub. No.: WO2005/030360

PCT Pub. Date: Apr. 7, 2005

(65) Prior Publication Data
US 2007/0272618 A1    Nov. 29, 2007

(30) Foreign Application Priority Data
Aug. 27, 2003 (CN) .................... 03 1 39172

(51) Int. Cl.
B01D 17/06 (2006.01)

(52) U.S. Cl. ............... 210/748.01; 210/748.05; 210/748.02; 210/767; 134/108

(58) Field of Classification Search ............... 210/748, 210/600, 748.01, 748.02, 748.05; 516/195; 204/193; 134/108
See application file for complete search history.

(56) References Cited

U.S. PATENT DOCUMENTS

| | | | | |
|---|---|---|---|---|
| 5,085,783 A | * | 2/1992 | Feke et al. | 210/748 |
| 5,951,456 A | * | 9/1999 | Scott | 516/195 |
| 6,216,538 B1 | * | 4/2001 | Yasuda et al. | 73/570.5 |
| 6,818,128 B2 | * | 11/2004 | Minter | 210/205 |

* cited by examiner

Primary Examiner—Walter D Griffin
Assistant Examiner—Cameron J Allen
(74) Attorney, Agent, or Firm—Ladas and Parry LLP

(57) ABSTRACT

A method for demulsifying water-oil emulsions through ultrasonic action, comprises a step of making the water-oil emulsions flow through at least one ultrasonic acting region in a flow direction, wherein: within the ultrasonic acting region, a concurrent ultrasonic wave whose traveling direction is the same as the flow direction of the water-oil emulsions is generated by at least a one first ultrasonic transducer provided at the upstream end of the ultrasonic acting region, and at same time, a countercurrent ultrasonic wave whose traveling direction is opposite to the flow direction of the water-oil emulsions is generated by at least a one second ultrasonic transducer provided at the downstream end of the ultrasonic acting region; and the concurrent ultrasonic wave and the countercurrent ultrasonic wave act simultaneously on the water-oil emulsions which flow through the ultrasonic acting region, so as to demulsify the water-oil emulsions. After being demulsified, the water-oil emulsions gravity settle and separate, or settle and separate under an electric field, so as to be dewatered. The present invention can apply to various water-oil separating technologies in the procedures from mining to processing of crude oil.

22 Claims, 3 Drawing Sheets

METHOD AND APPARATUS FOR DEMULSIFYING AN OIL-WATER EMULSION VIA ULTRASONIC

FIELD OF THE INVENTION

The present invention relates to ultrasonic methods and devices for demulsifying water-oil emulsions.

DESCRIPTION OF THE RELATED ART

In a process of mining crude oil in an oilfield, the crude oil is formed into a structure of water-oil emulsions by infusing a great volume of water and surfactants or by mechanical action. The crude oil mined from underground sometimes has water content up to 90% or more. In order to separate the oil from the water, it is crucial to demulsify the structure of water-oil emulsions. First, the crude oil mined in an oilfield is to undergo a gravity settling dewatering procedure, and the key of dewatering effects is the effects of demulsifying water-oil emulsions. Next, since there are index requirements of salt content for the crude oil delivered to an oil refinery from an oilfield, fresh water needs to be infused again to perform the first to third stage of electrostatic desalting process including water infusing—salt washing—electric field dewatering—desalting, wherein a process for demulsifying the structure of water-oil emulsions is involved to separate the oil from the water so as to dewater and finally meet the index requirements of desalting.

In a stage of processing crude oil, the crude oil delivered from an oilfield contains water per se, which generally exists in a form of emulsions in the crude oil. Besides, the first processing procedure of the crude oil after entering an oil refinery is the first to third stage of electrical desalting process including water infusing—salt washing—electric field dewatering—desalting, in which a new emulsion structure would be formed again. To obtain better desalting effects, it is crucial to demulsify those two types of structures of water-oil emulsions. In addition, in an oil refinery, demulsifying dewater is required in a process for recovering the contaminated oil deposited at bottom of crude oil tanks, in a process for recovering the salt-containing drained water released by electrostatic desalting crude oil, in processes for electric refining gasoline, kerosene and diesel, and in a process for denitrifying and electric refining lubricating-oil.

At present, the methods for demulsifying water-oil emulsions mainly comprise the following manners: heating, applying electric field of high voltage, adding demulsifying agents and their combination. However, as the quality of the crude oil becomes poor, the effects of processing complex, stably emulsified water-oil emulsions by those methods are not good enough to satisfy production requirements. As a kind of energy, ultrasonic wave can travel in flowing water-oil emulsions, and can produce relative displacement between two different mediums of oil and saline water. Therefore, a method of using ultrasonic wave to assist other desalting and dewatering processes appears to satisfy production requirements.

The utility model patent with publication number CN2296230Y published on Nov. 4, 1998 discloses a technique for demulsifying water-oil emulsions through ultrasonic action, wherein the orientation of an ultrasonic transducer is perpendicular to the axis of a ultrasonic acting region, so as to cause the ultrasonic acting direction perpendicular to the flowing direction of water-oil emulsions. Therefore the water-oil emulsions stay in the ultrasonic acting region for a short period. Furthermore, if the ultrasonic acting region is a circular tube, as the ultrasonic waves are converged through reflection due to the arc inner surface of the circular tube, it is easy to produce locally excessive sound intensity, which produce uneven ultrasonic sound intensity in the ultrasonic acting region and thus easily cause the emulsification of water-oil.

U.S. invention U.S. Pat. No. 5,885,424 filed in year 1999 discloses a structure of ultrasonic acting region, wherein an ultrasonic transducer is mounted to a flat rectangular box, resulting in the ultrasonic acting region being a rectangular region; the transducer is mounted to an upper external surface or a lower external surface of a pipe. By using this structure, the acting area of the ultrasonic wave is appropriately increased through the external surfaces of the rectangular box, and thus the acting time of the ultrasonic wave is somewhat lengthened. However, since the ultrasonic acting direction is perpendicular to the flowing direction of water-oil emulsions, the acting time of the ultrasonic wave is still short and the acting effects are not significant. Therefore, it has no industrial application value. Till now, there is no successful technique which applies ultrasonic wave to industrial continuous production technology.

SUMMARY OF THE INVENTION

An object of the present invention is, with respect to the above defects in the prior art, to provide a method and a device for demulsifying water-oil emulsions through ultrasonic action, in order to solve the above problems that the ultrasonic wave is prone to converge unevenly, the acting area is small or the acting time is short, existing in the prior art, so that the effects of demulsifying water-oil emulsions are enhanced and the industrial application of demulsifying water-oil emulsions through ultrasonic action is realized.

For that, the present invention provides a method for demulsifying water-oil emulsions through ultrasonic action, which comprises a step of making water-oil emulsions flow through at least one ultrasonic acting region along a flow direction, characterized in that: within the ultrasonic acting region, a concurrent ultrasonic wave whose traveling direction is same as the flow direction of the water-oil emulsions is generated by at least one first ultrasonic transducer provided at the upstream end of the ultrasonic acting region, and at same time, a countercurrent ultrasonic wave whose traveling direction is opposite to the flow direction of the water-oil emulsions is generated by at least one second ultrasonic transducer provided at the downstream end of the ultrasonic acting region; the concurrent ultrasonic wave and the countercurrent ultrasonic wave act simultaneously on the water-oil emulsions which flow through the ultrasonic acting region, so as to demulsify the water-oil emulsions.

Wherein the following preferred manners can be further employed: said flowing direction in which the water-oil emulsions flow through the ultrasonic acting region can be identical with the direction of the central axis of the ultrasonic acting region; it is preferred that the concurrent ultrasonic wave and the countercurrent ultrasonic wave travel with uniform sound intensity within the ultrasonic acting region and the sound intensity of the countercurrent ultrasonic wave is not lower than that of the concurrent ultrasonic wave. Preferably, the sound intensity of the countercurrent ultrasonic wave is not greater than 0.8 W/cm$^2$, and most preferably not greater than 0.5 W/cm$^2$.

The present invention further provides an demulsifying device for applying the above method, comprising at least one ultrasonic acting region through which the water-oil emulsions flow, wherein at the upstream end of the ultrasonic acting region there is mounted at least one first ultrasonic transducer for generating a concurrent ultrasonic wave whose traveling direction is same as the flow direction of the water-oil emulsions; at the downstream end of the ultrasonic acting region there is mounted at least one second ultrasonic transducer for generating a countercurrent ultrasonic wave whose traveling direction is opposite to the flow direction of the water-oil emulsions; an ultrasonic generator is connected with the first and second ultrasonic transducers via ultrasonic power lines, so that the first and second ultrasonic transducers can be driven to generate the concurrent ultrasonic wave and the countercurrent ultrasonic wave.

Wherein the ultrasonic acting region can be of a pipe structure and is connected with other water-oil emulsion pipes in the production and processing line; wherein the ultrasonic acting region can be of a pipe structure with a constant diameter or can be of a pipe structure having a varying diameter.

Thus it can be seen that the present invention substantively provides a method and a device for demulsifying water-oil emulsions through combined action of concurrent and countercurrent ultrasonic waves, wherein the combined action of concurrent and countercurrent ultrasonic waves acts on the water-oil emulsions and the acting direction of ultrasonic waves is substantially parallel to the flowing direction of the water-oil emulsions, so that the time of ultrasonic wave acting on water-oil emulsions is greatly lengthened and the water-oil emulsions can be fully demulsified.

BRIEF DESCRIPTION OF THE ACCOMPANYING DRAWING

DETAILED DESCRIPTION OF THE PREFERRED EMBODIMENTS

Figure 1:
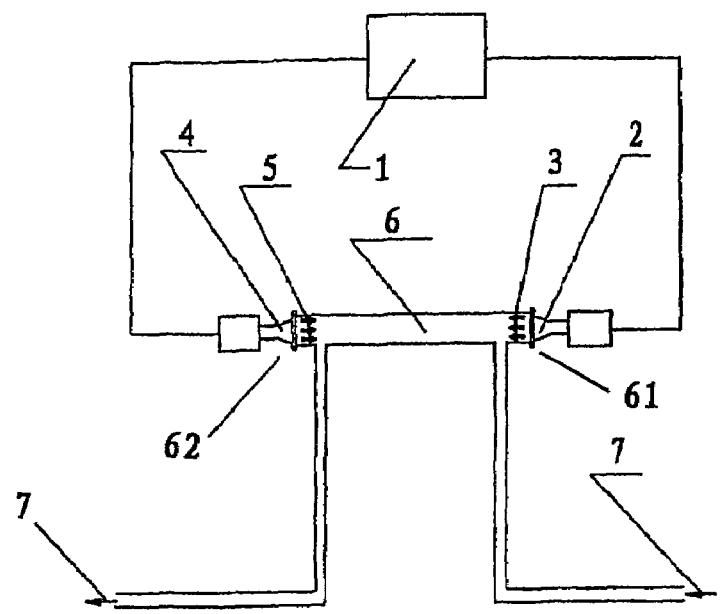
FIG. 1 is a schematic diagram of an embodiment of the present invention.

Referring to FIG. 1, the present invention provides a method for demulsifying water-oil emulsions through ultrasonic action, which comprises a step of making the water-oil emulsions flow through at least one ultrasonic acting region 6 along a flow direction 7, characterized in that: within the ultrasonic acting region 6, a concurrent ultrasonic wave 3 whose traveling direction is same as the flow direction 7 of said water-oil emulsions is generated by at least one first ultrasonic transducer 2 provided at the upstream end 61 of the ultrasonic acting region 6, and at same time, a countercurrent ultrasonic wave 5 whose traveling direction is opposite to the flow direction 7 of said water-oil emulsions is generated by at least one second ultrasonic transducer 4 provided at the downstream end 62 of the ultrasonic acting region 6; said concurrent ultrasonic wave 3 and the countercurrent ultrasonic wave 5 act simultaneously on the water-oil emulsions which flow through said ultrasonic acting region 6, so as to demulsify the water-oil emulsions.

In the embodiment shown in FIG. 1, the direction of the central axis of the ultrasonic acting region 6 is identical with said flowing direction 7 in which the water-oil emulsions flow through the ultrasonic acting region 6. The concurrent ultrasonic wave 3 and the countercurrent ultrasonic wave 5 travel with uniform sound intensity within the ultrasonic acting region 6, wherein, preferably, the sound intensity of the countercurrent ultrasonic wave 5 can be selected to be generally not higher than 0.8 W/cm$^2$, and most preferably not higher than 0.5 W/cm$^2$. The sound intensity of the countercurrent ultrasonic wave 5 can be selected to be generally not lower than that of the concurrent ultrasonic wave 3, so as to facilitate the demulsifying of water-oil emulsions; otherwise emulsifying of the oil and the water may be produced which does not facilitate the desalting and dewatering of water-oil.

Referring to FIG. 1, a demulsifying device for embodying the above method provided by the present invention comprises at least one ultrasonic acting region 6 through which the water-oil emulsions flow; at the upstream end 61 of the ultrasonic acting region 6 there is mounted at least one first ultrasonic transducer 2 for generating a concurrent ultrasonic wave 3 whose traveling direction is same as the flow direction 7 of the water-oil emulsions; at the downstream end 62 of the ultrasonic acting region 6 there is mounted at least one second ultrasonic transducer 4 for generating a countercurrent ultrasonic wave 5 whose traveling direction is opposite to the flow direction 7 of the water-oil emulsions; an ultrasonic generator 1 is connected with the first ultrasonic transducer 2 and second ultrasonic transducer 4 via ultrasonic power lines, so that said first and second ultrasonic transducers can be driven to generate the concurrent ultrasonic wave 3 and the countercurrent ultrasonic wave 5.

Figure 2:
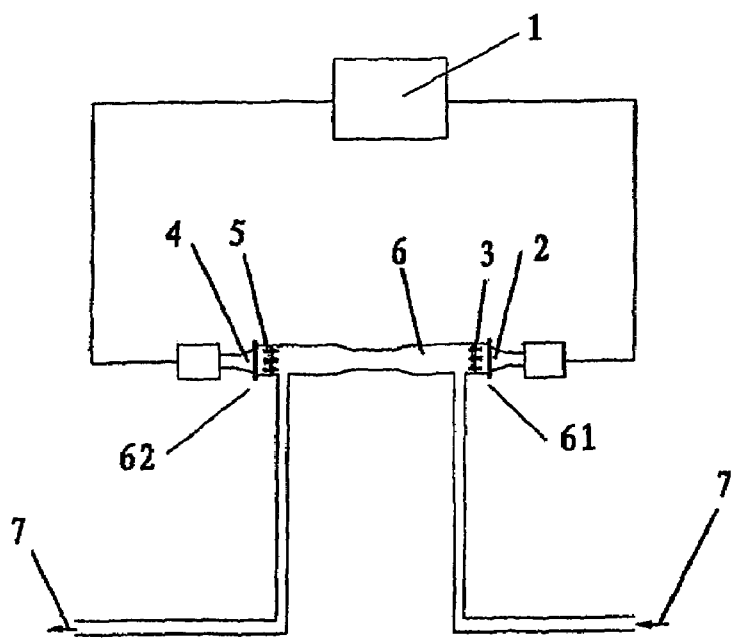
FIG. 2 is a schematic diagram of a second embodiment of the present invention.

In the present embodiment, the ultrasonic acting region 6 is of a pipe structure and can be connected with other water-oil emulsion pipes in production and processing line. In the embodiment shown in FIG. 1, the ultrasonic acting region 6 is of a pipe structure having a constant diameter. The ultrasonic acting region 6 may be also of a pipe structure having a varying diameter. For example, in the embodiment shown in FIG. 2, there is employed a diameter-varying pipe structure, the both ends of which have a greater diameter and the middle portion of which has a smaller diameter. There may be also employed a diameter-varying pipe structure having a smaller diameter at both ends and a greater diameter in the middle portion, and of course, there may be also employed a diameter-varying pipe structure having a greater diameter at one end and a smaller diameter at other end, and other structure forms usually used in the prior art. The section of the pipe may be of various shapes, such as circle, square, and the like. The ultrasonic acting region 6 may be connected with the water-oil pipes through various connection manners such as welding or using flanges and the like in the prior art.

The ultrasonic generator 1 supplies power energy to the first ultrasonic transducer 2 and second ultrasonic transducer 4 to make them respectively generate corresponding ultrasonic waves which are substantially parallel to the flowing direction 7 of water-oil emulsions, which can be accomplished by many manners and structures known in the prior art. In FIG. 1, the mounting directions of the first ultrasonic transducer 2 and second ultrasonic transducer 4 require that the directions of the concurrent ultrasonic wave 3 and the countercurrent ultrasonic wave 5 generated by them are substantially parallel to the flowing direction 7 of water-oil emulsions, which flowing direction 7 is substantially parallel to the direction of the central axis of the pipe of the ultrasonic acting region 6.

Under the combined action of concurrent and countercurrent ultrasonic waves, the water-oil emulsions, which are input by the pipe and pass through the ultrasonic acting region 6, can be satisfactorily demulsified, and after the demulsifying the water-oil mixture is settled and separated under the action of a electric field and thus is dewatered.

The concurrent ultrasonic wave 3 and the countercurrent ultrasonic wave 5, which travel in the same and the opposite direction to the flowing direction 7 of the water-oil emulsions respectively, are combined with each other to act on the water-oil emulsions. Since the ultrasonic acting region 6 is of a pipe structure, the reflection surface of the ultrasonic acting region has no curved structure in the radiation direction of the ultrasonic wave, so as to prevent the generated ultrasonic waves from converging and overlapping and prevent water-oil from being emulsified. This ultrasonic acting region can generate ultrasonic waves with uniform sound intensity acting for long period in the pipe in which water-oil emulsions flow, to reach better desalting and dewatering effects.

Under general conditions, the selection of the frequency of the ultrasonic wave does not greatly affect the effects of desalting and dewatering water-oil. The ultrasonic wave easily attenuates with high frequency. Therefore it is generally suitable to employ ultrasonic wave of 0.1-50 KHz. According to different production conditions, in order to lengthen the period of the ultrasonic wave acting on the crude oil in flowing state, more than two ultrasonic acting regions may be provided in series or in parallel to satisfy different production requirements.

Comparing with the prior art, according to the method and device of the present invention, there is provided an ultrasonic acting region capable of generating uniform sound intensity, which ultrasonic acting region is capable of lengthening the acting period of ultrasonic wave. The direction of the axis of the ultrasonic acting region is identical with the flow direction of water-oil; the ultrasonic wave travels to the distal end of the pipe without overlapping and converge; the acting time of ultrasonic wave is lengthened; the ultrasonic wave having uniform sound intensity is generated; the emulsion structure of water-oil is demulsified; and the dewatering effects are improved. It is shown by industrial tests that, as comparing to a simple electrostatic desalting method, the salt content of water-oil after being desalted can be reduced from 5-10 mg/l to 1-4 mg/l using this water-oil ultrasonic-electrostatic desalting method. The water content of the processed crude oil is reduced from the initial 0.4-0.8% to 0.1-0.4%. If the method and device of the present invention is used to process high water-content contaminated oil or high water-content crude oil, the oil content in the drained water can be decreased by about 50% or more.

The present invention can be used in the procedure of processing crude oil in an oil refinery, i.e. in a technology for electrostatic desalting and dewatering crude oil, in technologies for electric refining and dewatering gasoline, kerosene and diesel, in a technology for denitrifying and electric refining and dewatering lubricating-oil, in a technology for recovering and dewatering oil contained in the salt-containing drained water produced by electrostatic desalting, and in a technology for recovering and dewatering crude oil in the contaminated oil at bottom of crude oil tanks. The present invention can also be used in a technology for gravity settling dewatering water-contained crude oil in mining crude oil in oilfields, and in a technology for electrostatic desalting and dewatering crude oil in oilfields.

Figure 3:
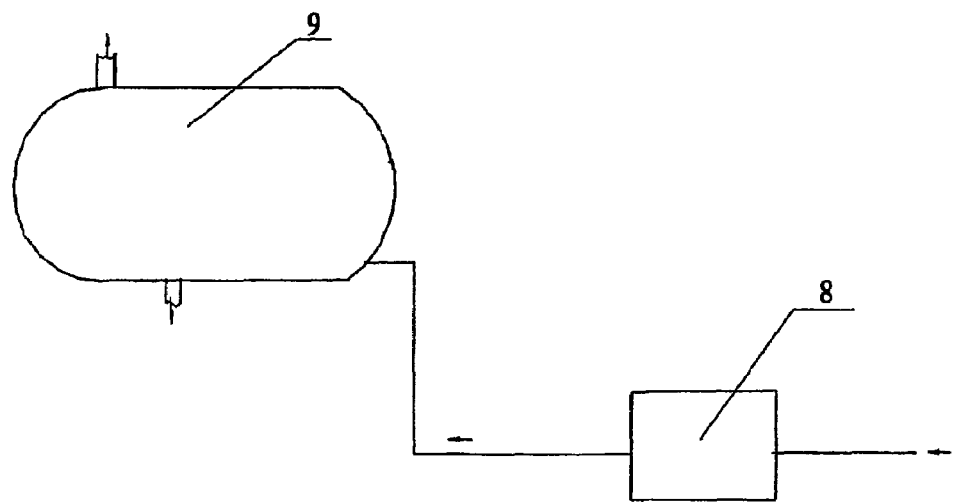
FIG. 3 is a technical process diagram of ultrasonic demulsifying—electrostatic desalting and dewatering the water-oil emulsions in crude oil by using the method of the present invention.

FIG. 3 is a technical process diagram of ultrasonic demulsifying—electrostatic desalting and dewatering the water-oil emulsions in crude oil by using the method of the present invention.

As shown in FIG. 3, after the crude oil of oil refinery or oilfield passes through an ultrasonic acting device 8 (which comprises the ultrasonic acting region 6 and the first and second ultrasonic transducers 2, 4), the emulsion structure of water-oil is demulsified; the crude oil then enters into an electrostatic desalting tank 9, in which it is desalted and dewatered under the action of an electric field of high voltage; and the crude oil flows out from upper part of the electrostatic desalting tank 9 and water flows out from its lower part through gravity settling and separation, so as to reach optimum desalting and dewatering effects.

(1) The desalting and dewatering results of industrial tests performed by applying the method of the present invention to an electrostatic desalting device in some oil refinery are listed as follows.

(a) The industrial production conditions prior to tests without using the present invention

| Test time | Salt content in crude oil after desalting and dewatering | Water content in crude oil after desalting and dewatering |
| --- | --- | --- |
| Jun. 10, 2003 | 5 mg/l | 0.4% |
| Jun. 11, 2003 | 6 mg/l | 0.4% |
| Jun. 13, 2003 | 10 mg/l | 0.7% |
| Jun. 20, 2003 | 5 mg/l | 0.5% |
| Jun. 21, 2003 | 7 mg/l | 0.4% |
| Jul. 22, 2003 | 5 mg/l | 0.5% |
| Jun. 23, 2003 | 7 mg/l | 0.4% |
| Jul. 1, 2003 | 10 mg/l | 0.8% |

(b) The results of industrial tests using the present invention

| Testing time | Salt content in crude oil after desalting and dewatering | Water content in crude oil after desalting and dewatering |
| --- | --- | --- |
| Jun. 13, 2003 | 1.6 mg/l | 0.2% |
| Jun. 14, 2003 | 2.6 mg/l | 0.3% |
| Jun. 15, 2003 | 2.5 mg/l | 0.1% |
| Jun. 16, 2003 | 2.7 mg/l | 0.2% |
| Jul. 2, 2003 | 2.8 mg/l | 0.2% |
| Jul. 3, 2003 | 3.2 mg/l | 0.3% |
| Jul. 4, 2003 | 4.0 mg/l | 0.2% |
| Jul. 5, 2003 | 1.8 mg/l | 0.1% |
| Jul. 15, 2003 | 2.5 mg/l | 0.3% |
| Jul. 16, 2003 | 2.7 mg/l | 0.2% |

By comparing the data in group (a) and group (b), it can be seen that, by using the method and device of the present invention in desalting and dewatering, the salt content in the crude oil after processed can be reduced by about 50%, and the water content in the crude oil after processed can be reduced by about 50%.

(2) By applying the method of the present invention to an electrostatic desalting device in some oil refinery, it is obvious that the electric voltage of electrostatic desalting is increased, the electric current of electrostatic desalting is decreased and that electric power consumption of electrostatic desalting is reduced.

In the case without changing other production conditions, the industrial application tests of the method and device of the present invention is performed during a first stage of electrostatic desalting, wherein 5% of water is infused in the first stage of electrostatic desalting; the simple electrostatic desalting operation in the second stage of electrostatic desalting is not changed, wherein only 3% of water is infused in the second stage of electrostatic desalting. Generally, in the case that the crude oil is seriously emulsified, the first stage of electrostatic desalting is lower than the second stage of electrostatic desalting in electric voltage, but greater in electric current. During the tests, the second stage of electrostatic desalting has lower electric voltage and greater electric current.

Some beneficial effects during the industrial tests are showed by some data below:

| Testing time | | First stage of electrostatic desalting using the present invention | | | Second stage of electrostatic desalting without using the present invention | | |
|---|---|---|---|---|---|---|---|
| Jun. 13, 2003, 9:00 | Voltage v | 348 | 360 | 350 | 348 | 364 | 354 |
| | Current I | 189 | 249 | 230 | 249 | 268 | 252 |
| Jun. 14, 2003 9:00 | Voltage v | 367 | 367 | 363 | 239 | 65 | 258 |
| | Current I | 163 | 228 | 185 | 358 | 528 | 375 |
| Jun. 15, 2003 9:00 | Voltage v | 344 | 355 | 354 | 154 | 58 | 224 |
| | Current I | 197 | 255 | 233 | 384 | 530 | 419 |
| Jun. 16, 2003 9:00 | Voltage v | 340 | 328 | 344 | 27 | 29 | 30 |
| | Current I | 207 | 291 | 229 | 445 | 529 | 446 |
| Jul. 2, 2003 9:00 | Voltage v | 301 | 322 | 307 | 285 | 280 | 285 |
| | Current I | 283 | 317 | 296 | 328 | 387 | 327 |
| Jul. 3, 2003 9:00 | Voltage v | 337 | 354 | 336 | 324 | 342 | 327 |
| | Current I | 253 | 275 | 262 | 282 | 303 | 284 |
| Jul. 4, 2003 9:00 | Voltage v | 373 | 384 | 365 | 363 | 375 | 366 |
| | Current I | 193 | 215 | 203 | 216 | 231 | 222 |

By comparing values indicating the electric voltages and currents of the first stage of electrostatic desalting using the present invention and the second stage of electrostatic desalting without using the present invention during the tests, it can be seen that the ultrasonic action of the present invention has the effects of reducing the electrostatic desalting current and increasing electrostatic desalting voltages. Generally, the reduction of the electrostatic desalting current can decrease electric power consumption of the electrostatic desalting.

Figure 4:
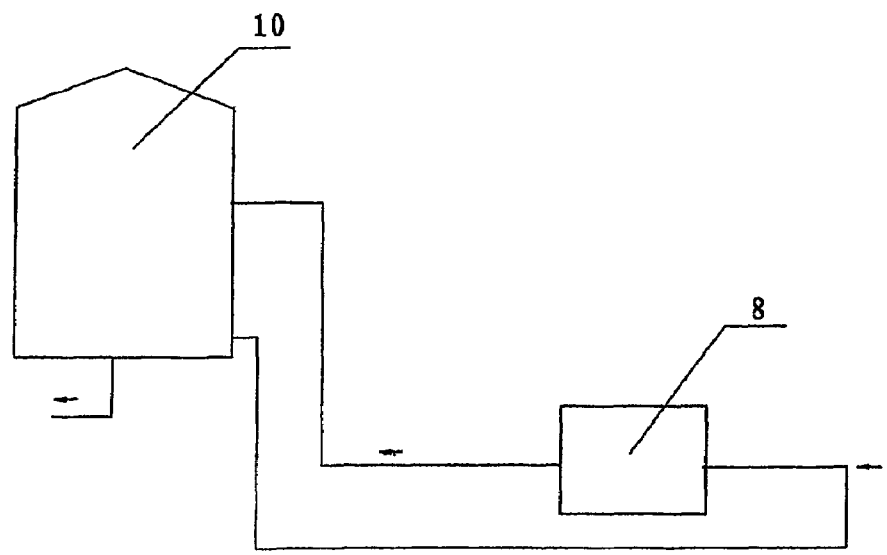
FIG. 4 is a technical process diagram of ultrasonic demulsifying—gravity settling dewatering the high water-content crude oil or high water-content contaminated oil by using the method of the present invention.

FIG. 4 is a technical process diagram of ultrasonic demulsifying—gravity settling dewatering high water-content crude oil or high water-content contaminated oil by using the method of the present invention.

As shown in FIG. 4, in contaminated oil at bottom of a crude oil tank in a settling tank 10, high water-content contaminated oil, high oil-content drained water discharged after the electrostatic desalting of crude oil, and high water-content crude oil mined from oil wells in oilfields, the emulsions may contain water up to 5% or more, or even up to 90% or more. The high water-content water-oil emulsions were demulsified after passing through the ultrasonic acting device 8, and then circulate into the contaminated oil settling tank 10 to be gravity settling dewatered under the action of gravity. The crude oil and contaminated oil are recovered after the water at the bottom of the tank is drained.

Below listed are, after the method and device of the present invention being employed, the results produced in recovering the oil contained in salt-containing drained water after electrostatic desalting.

(1) The oil content in the drained water when recovering the oil contained in the settled salt-containing drained water is as follows:

| Jul. 1, 2003 | 7% |
|---|---|
| Jul. 6, 2003 | 10% |
| Jul. 7, 2003 | 9% |
| Jul. 8, 2003 | 10% |
| Jul. 9, 2003 | 10% |

(2) When the method and device of the present invention are used, the oil content in the drained water when recovering the oil contained in the salt-containing drained water is as follows:

| Jul. 2, 2003 | 3.5% |
|---|---|
| Jul. 3, 2003 | 4% |
| Jul. 4, 2003 | 4% |
| Jul. 5, 2003 | 4% |

By comparing the data in group (1) and group (2), it can be seen that, by using the method and device of the present invention in tank gravity settling dewatering, the oil content in the drained water can be reduced by about 50% or more.

Figure 5:
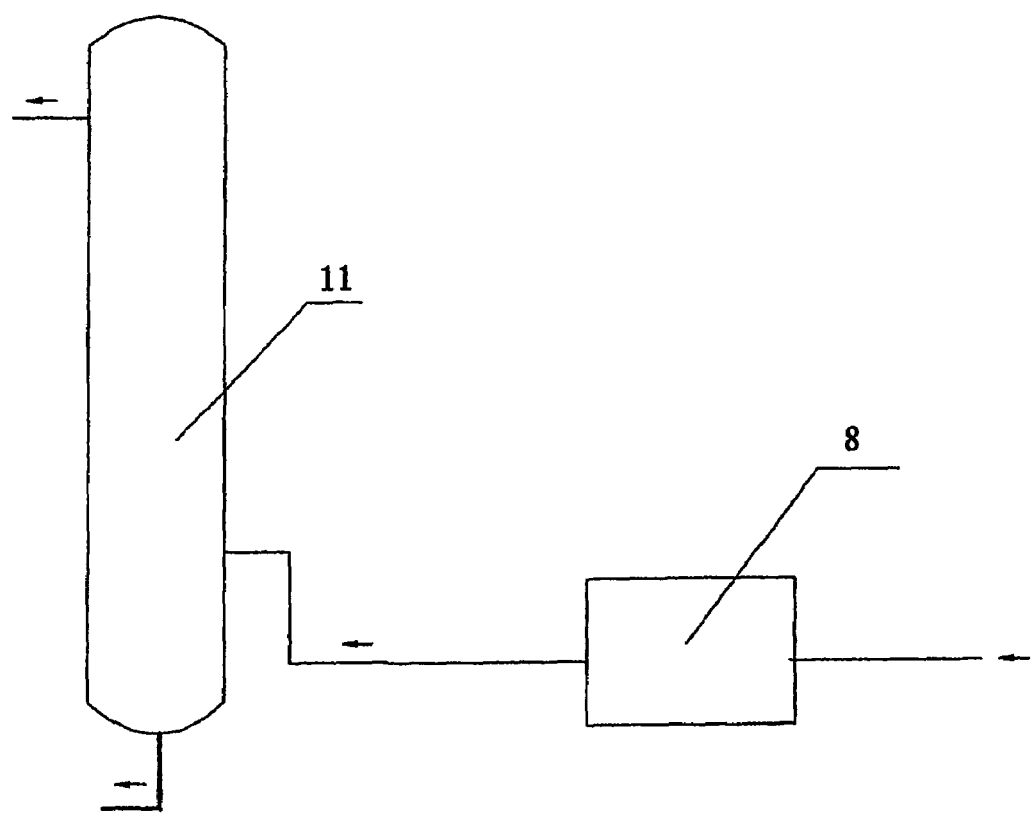
FIG. 5 is a technical process diagram of ultrasonic demulsifying—electric refining and dewatering the crude oil distillate by using the method of the present invention.

FIG. 5 is a technical process diagram of ultrasonic demulsifying-electric refining and dewatering the crude oil distillate by using the method of the present invention.

As shown in FIG. 5, during electric refining the crude oil distillate, the implement scheme using the method and device of the present invention can be applied to demulsifying and dewatering technologies for electric refining gasoline, kerosene and diesel, as well as to the demulsifying and dewatering process for denitrifying and electric refining lubricating-oil. FIG. 5 shows that, the foregoing various crude oil distillates, after passing through the ultrasonic acting device 8, have the water-oil emulsion structure demulsified, and then enter into an electric refining tank 11 to continue dewatering, gravity settling, and draining under the action of an electric field of high voltage.

Experimental comparison is made below to the demulsifying effects produced by combined action of the concurrent and countercurrent ultrasonic waves using the method of the present invention and the demulsifying effects produced by the unidirectional concurrent ultrasonic wave or countercurrent ultrasonic wave:

Taking the technical scheme for ultrasonic-electrostatic desalting the crude oil shown in FIG. 3 as an example, the test of the unidirectional ultrasonic action can be performed by turning off the first ultrasonic transducer 2 or the second ultrasonic transducer 4. Comparing to the technical scheme of the countercurrent or concurrent ultrasonic wave, the combined action of both the countercurrent and concurrent ultrasonic waves is more effective in demulsifying the water-oil emulsions, reducing the salt content in the processed crude oil, decreasing the water content in the processed crude oil, and lowering the oil content in the drained water after processing.

(1) At frequency of 20 KHz, the compared results of the desalting effects obtained by the combined concurrent and countercurrent, single countercurrent, single concurrent ultrasonic-electrostatic desalting devices are as follows:

| Sound intensity | Combined concurrent and countercurrent | Single countercurrent | Single concurrent |
|---|---|---|---|
| 0.5 W/cm$^2$ | 1.2 mg/l | 3.5 mg/l | 4.5 mg/l |
| 0.4 W/cm$^2$ | 1.5 mg/l | 4.0 mg/l | 5.0 mg/l |
| 0.3 W/cm$^2$ | 2.1 mg/l | 4.4 mg/l | 5.1 mg/l |
| 0.2 W/cm$^2$ | 2.8 mg/l | 4.7 mg/l | 5.6 mg/l |
| 0.1 W/cm$^2$ | 3.1 mg/l | 5.6 mg/l | 6.2 mg/l |

Without be applied the ultrasonic action, the crude oil contains salt of about 8 mg/l after electrostatic desalting.

In the tests under the same sound intensity of the ultrasonic wave, by implementing the method and device of the present invention under combined action of both concurrent and countercurrent, as comparing to single concurrent or single countercurrent, the salt content of the crude oil after electrostatic desalting is reduced by about 50%. The salt contained in the crude oil after electrostatic desalting by using ultrasonic-electrostatic desalting combined device with combined action of both concurrent and countercurrent ultrasonic waves, is obviously lower than that by using only the concurrent or countercurrent.

(2) At frequency of 20 KHz, the compared results of the dewatering effects obtained by the combined concurrent and countercurrent, single countercurrent, single concurrent ultrasonic-electrostatic desalting devices are as follows:

| Sound intensity | Combined concurrent and countercurrent | Single countercurrent | Single concurrent |
|---|---|---|---|
| 0.5 W/cm$^2$ | 0.18% | 0.32% | 0.45% |
| 0.4 W/cm$^2$ | 0.19% | 0.41% | 0.48% |
| 0.3 W/cm$^2$ | 0.22% | 0.43% | 0.51% |
| 0.2 W/cm$^2$ | 0.25% | 0.46% | 0.58% |
| 0.1 W/cm$^2$ | 0.30% | 0.59% | 0.66% |

Without being applied the ultrasonic action, the crude oil contains water of about 0.8% after electrostatic desalting.

Thus it can be seen that, in the tests under the same sound intensity of the ultrasonic wave, by using the method and device of the present invention under combined action of both concurrent and countercurrent, as comparing to single concurrent or single countercurrent, the water content of the crude oil after electrostatic desalting is reduced by about 40-60%. In the case using ultrasonic-electrostatic desalting combined device with combined action of both concurrent and countercurrent ultrasonic waves, the water content of the crude oil after dewatering is obviously lower than that by using only concurrent or countercurrent, to obtain better dewatering effects.

(3) At frequency of 20 KHz, the compared results of the oil content in the drained water after being desalted by the combined concurrent and countercurrent, single countercurrent, single concurrent ultrasonic-electrostatic desalting devices are as follows:

The effects obtained by implementing the method and device of combined action of both concurrent and countercurrent of the present invention, as comparing to those obtained by single electrostatic desalting, can cause the oil content in the drained water produced by desalting the crude oil to reduce by about 50%.

By comparing the implementing effects of single countercurrent ultrasonic-electrostatic desalting device to those obtained by simple electrostatic desalting, it is found that the oil contents in the drained water produced by desalting the crude oil in both cases correspond to each other.

In the implementing effects of single concurrent ultrasonic-electrostatic desalting device, as comparing to those obtained by single electrostatic desalting, however, the oil contents in the drained water produced by desalting the crude oil increase by about 40%, causing a certain extent of water-oil emulsions.

Thus it can be seen that, the effects obtained by implementing the method and device of combined action of both concurrent and countercurrent of the present invention, as comparing to those obtained by single countercurrent or concurrent ultrasonic-electrostatic desalting device, can reduce significantly the oil content in the drained water after desalting.

What is claimed is:

1. A method for demulsifying water-oil emulsions through ultrasonic action, comprising a step of making water-oil emulsions flow through at least one ultrasonic acting region in a flow direction from an upstream end to a downstream end of the at least one ultrasonic acting region, characterized in that: within said ultrasonic acting region, a concurrent ultrasonic wave whose traveling direction is the same as the flow direction of said water-oil emulsions is generated by at least one first ultrasonic transducer provided at the upstream end of said ultrasonic acting region, and at same time, a countercurrent ultrasonic wave whose traveling direction is opposite to the flow direction of said water-oil emulsions is generated by at least one second ultrasonic transducer provided at the downstream end of said ultrasonic acting region; and the concurrent ultrasonic wave and the countercurrent ultrasonic wave act simultaneously on the water-oil emulsions flowing through said ultrasonic acting region, so as to demulsify said water-oil emulsions.

2. The method according to claim 1, characterized in that, the orientation of the central axis of said ultrasonic acting region is identical with said flowing direction in which said water-oil emulsions flow through said ultrasonic acting region.

3. The method according to claim 1, characterized in that, said concurrent ultrasonic wave and the countercurrent ultrasonic wave travel with uniform sound intensity within said ultrasonic acting region; the sound intensity of said countercurrent ultrasonic wave is no lower than that of said concurrent ultrasonic wave.

4. The method according to claim 1, characterized in that, the sound intensity of said countercurrent ultrasonic wave is no higher than 0.8 W/cm$^2$.

5. The method according to claim 4, characterized in that, the sound intensity of said countercurrent ultrasonic wave is no higher than 0.5 W/cm².

6. A demulsifying device for implementing the method according to claim 1, the demulsifying device comprising at least one ultrasonic acting region in which water-oil emulsions flow from an upstream end to a downstream end of the at least one ultrasonic acting region, characterized in that, at the upstream end of said ultrasonic acting region there is mounted the first ultrasonic transducer for generating a concurrent ultrasonic wave whose traveling direction is the same as the flow direction of said water-oil emulsions, and at the downstream end of said ultrasonic acting region there is mounted the second ultrasonic transducer for generating a countercurrent ultrasonic wave whose traveling direction is opposite to the flow direction of said water-oil emulsions; and a ultrasonic generator is connected with said first and second ultrasonic transducers via ultrasonic power lines, so as to drive said first and second ultrasonic transducers to generate said concurrent ultrasonic wave and said countercurrent ultrasonic wave.

7. The demulsifying device according to claim 6, characterized in that, said ultrasonic acting region is of a pipe structure and is connected with other water-oil emulsion pipes in production and processing line.

8. The demulsifying device according to claim 7, characterized in that, said ultrasonic acting region is of a pipe structure with a constant diameter.

9. The demulsifying device according to claim 7, characterized in that, said ultrasonic acting region is of a pipe structure with a varying diameter.

10. The method according to claim 3, characterized in that, the sound intensity of said countercurrent ultrasonic wave is no higher than 0.8 W/cm².

11. The method according to claim 4, characterized in that, the sound intensity of said countercurrent ultrasonic wave is no higher than 0.8 W/cm².

12. The method according to claim 10, characterized in that, the sound intensity of said countercurrent ultrasonic wave is no higher than 0.5 W/cm².

13. The method according to claim 11, characterized in that, the sound intensity of said countercurrent ultrasonic wave is no higher than 0.5 W/cm².

14. A method for demulsifying a water-oil emulsion through ultrasonic action, comprising a step of making the water-oil emulsion flow through at least one ultrasonic acting region in a flow direction from an upstream end to a downstream end of the at least one ultrasonic acting region such that, within said ultrasonic acting region, a concurrent ultrasonic wave whose traveling direction is the same as the flow direction of said water-oil emulsion is generated by at least a first ultrasonic transducer provided at the upstream end of said ultrasonic acting region and, at the same time, a countercurrent ultrasonic wave whose traveling direction is opposite to the flow direction of said water-oil emulsion is generated by at least a second ultrasonic transducer provided at the downstream end of said ultrasonic acting region; wherein the concurrent ultrasonic wave and the countercurrent ultrasonic wave act simultaneously on the water-oil emulsion flowing through said ultrasonic acting region to demulsify said water-oil emulsion with formation of a water-oil mixture, wherein the combined action of the concurrent and countercurrent ultrasonic waves having a demulsifying effect that is greater than that of the concurrent or countercurrent ultrasonic wave alone.

15. The method according to claim 14, wherein said ultrasonic acting region has a central axis with an orientation that is identical with said flow direction in which said water-oil emulsion flows through said ultrasonic acting region.

16. The method according to claim 14, wherein the concurrent ultrasonic wave and the countercurrent ultrasonic wave travel with uniform sound intensity within said ultrasonic acting region; the sound intensity of said countercurrent ultrasonic wave being no lower than that of said concurrent ultrasonic wave.

17. The method according to claim 14, wherein the sound intensity of said countercurrent ultrasonic wave is no higher than 0.8 W/cm².

18. The method according to claim 16, wherein the ultrasonic acting region comprises a pipe structure with varying diameter.

19. The method according to claim 17, wherein the sound intensity of the countercurrent ultrasonic wave is no higher than 0.5 W/cm².

20. The method according to claim 1, wherein water-oil mixtures are formed by the demulsifying of said water-oil emulsions, said step comprising causing said water-oil emulsions to flow through the upstream end of the at least one ultrasonic acting region through a single inlet and to flow through the downstream end of the at least one ultrasonic acting region through a single outlet, the method comprising a subsequent step of desalting and dewatering the water-oil emulsions.

21. The demulsifying device according to claim 6, wherein the ultrasonic acting region is provided with a single inlet for water-oil emulsions to flow through the upstream end of the ultrasonic acting region and a single outlet for water-oil mixtures to flow from the downstream end of the ultrasonic acting region.

22. The method according to claim 14, wherein a water-oil mixture is formed by the demulsifying of said water-oil emulsion, the method comprising a subsequent step of dewatering the water-oil emulsion formed by the demulsifying with an electric field.

* * * * *